(12) United States Patent
Osburn

(10) Patent No.: US 9,306,946 B1
(45) Date of Patent: Apr. 5, 2016

(54) INTELLIGENT ELECTRONIC CRYPTOGRAPHIC CLOUD COMPUTING SYSTEM

(75) Inventor: Douglas C. Osburn, Houston, TX (US)

(73) Assignee: DJ INVENTIONS, LLC, Houston, TX (US)

( * ) Notice: Subject to any disclaimer, the term of this patent is extended or adjusted under 35 U.S.C. 154(b) by 895 days.

(21) Appl. No.: 13/590,297

(22) Filed: Aug. 21, 2012

(51) Int. Cl.
*H04L 29/06* (2006.01)
*H04L 9/00* (2006.01)

(52) U.S. Cl.
CPC .................................. *H04L 63/0876* (2013.01)

(58) Field of Classification Search
None
See application file for complete search history.

(56) References Cited

U.S. PATENT DOCUMENTS

| | | | |
|---|---|---|---|
| 5,638,378 A | 6/1997 | Scop et al. | |
| 5,719,771 A | 2/1998 | Buck et al. | |
| 5,745,384 A | 4/1998 | Lanzerotti et al. | |
| 5,794,009 A | 8/1998 | Coleman et al. | |
| 5,812,394 A | 9/1998 | Lewis et al. | |
| 6,032,154 A | 2/2000 | Coleman et al. | |
| 6,411,987 B1 | 6/2002 | Steger et al. | |
| 6,628,992 B2 | 9/2003 | Osburn, III | |
| 6,658,349 B2 | 12/2003 | Cline | |
| 6,687,573 B2 | 2/2004 | Egolf et al. | |
| 6,751,562 B1 | 6/2004 | Blackett et al. | |
| 6,950,851 B2 | 9/2005 | Osburn, III | |
| 6,961,753 B1 | 11/2005 | Osburn, III | |
| 7,073,183 B2 | 7/2006 | Hekizono | |
| 7,225,248 B1 | 5/2007 | Osburn, III | |
| 7,286,914 B2 | 10/2007 | Cerchione et al. | |
| 7,587,481 B1 | 9/2009 | Osburn, III | |
| 7,644,289 B2* | 1/2010 | Yancy et al. | 713/192 |
| 7,646,298 B1 | 1/2010 | Osburn, III et al. | |
| 7,673,337 B1 | 3/2010 | Osburn, III | |
| 7,673,338 B1 | 3/2010 | Osburn, III et al. | |
| 7,747,710 B1 | 6/2010 | Osburn, III et al. | |
| 8,069,242 B2 | 11/2011 | Hadar et al. | |
| 8,204,717 B2 | 6/2012 | McLaughlin et al. | |
| 8,514,868 B2* | 8/2013 | Hill | 370/401 |
| 8,931,038 B2* | 1/2015 | Pulier et al. | 726/1 |
| 2004/0217900 A1 | 11/2004 | Martin et al. | |
| 2004/0244265 A1 | 12/2004 | Miyata et al. | |
| 2005/0138120 A1 | 6/2005 | Gundersen et al. | |
| 2011/0247047 A1* | 10/2011 | Loureiro et al. | 726/1 |
| 2011/0289310 A1* | 11/2011 | Selgas et al. | 713/150 |
| 2012/0185913 A1* | 7/2012 | Martinez et al. | 726/1 |
| 2013/0305039 A1* | 11/2013 | Gauda | 713/153 |

FOREIGN PATENT DOCUMENTS

JP    53098861    8/1978

* cited by examiner

*Primary Examiner* — Christopher Revak
(74) *Attorney, Agent, or Firm* — Buskop Law Group, P.C.; Wendy Buskop

(57) ABSTRACT

An intelligent electronic cryptographic cloud computing system can include a computing cloud. The computing cloud can include one or more data storages and one or more processors, one of which is an enterprise server. The computing cloud can be configured to provide at least one service with shared hardware and software resources.

16 Claims, 7 Drawing Sheets

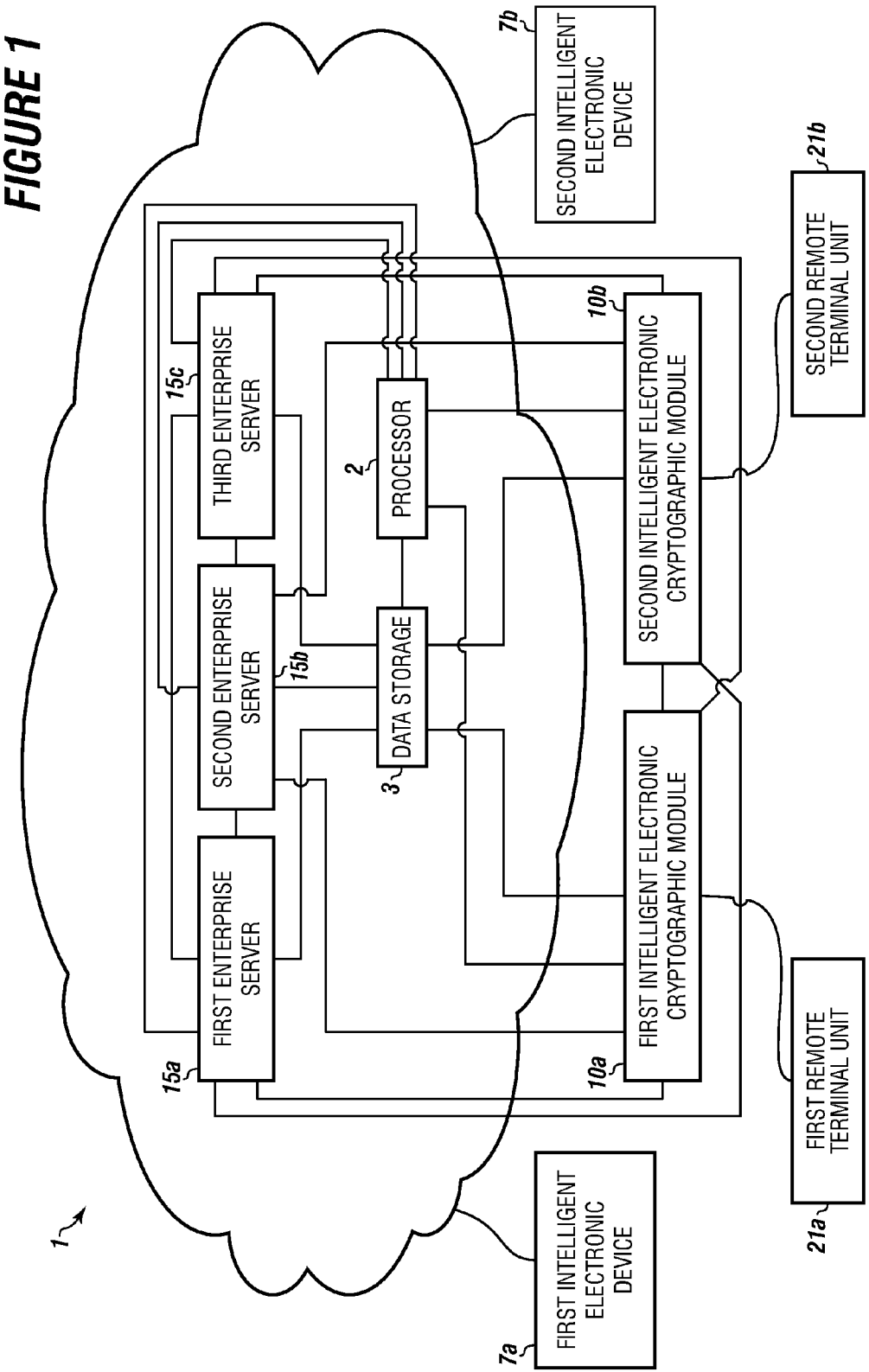

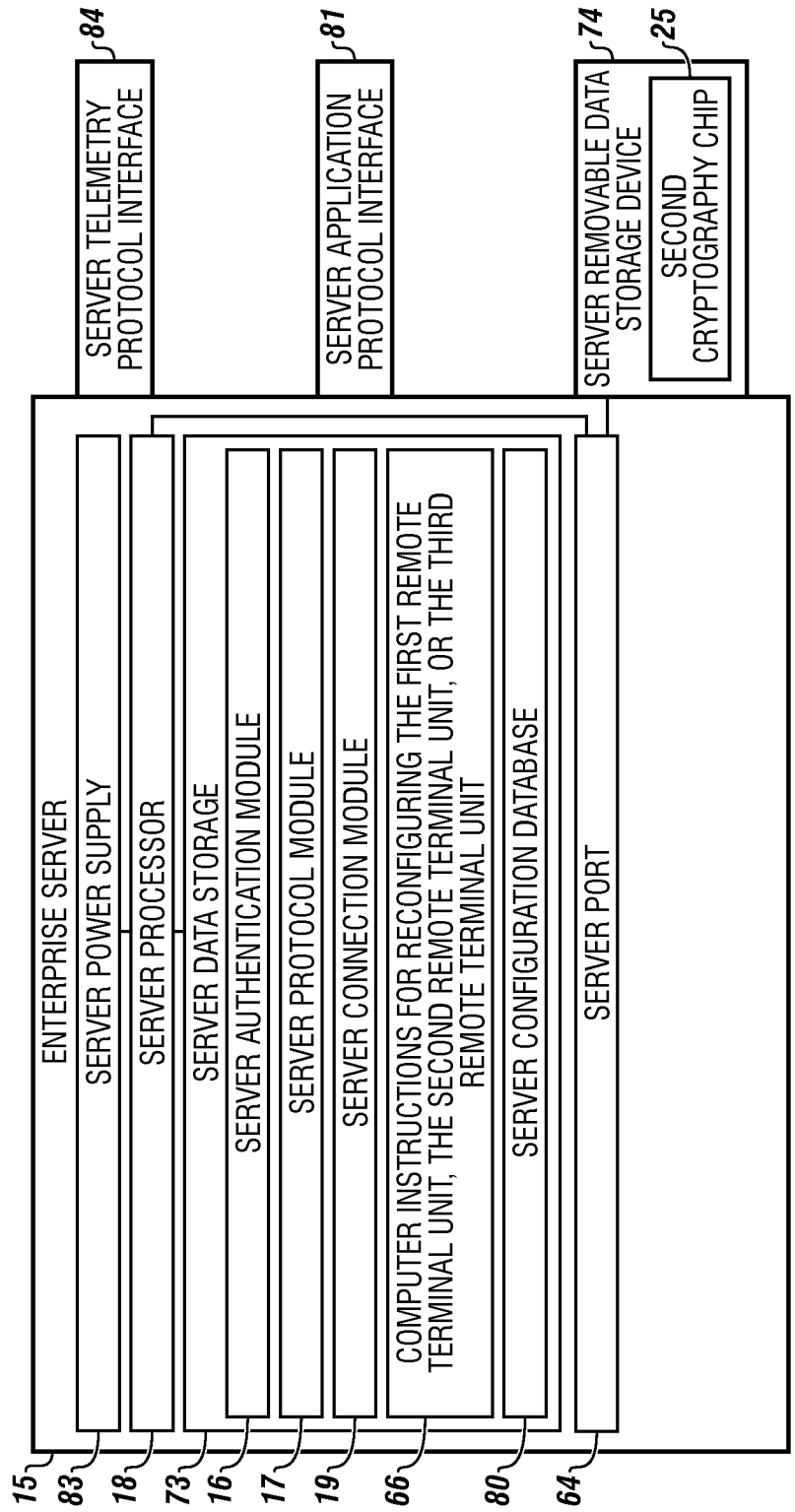

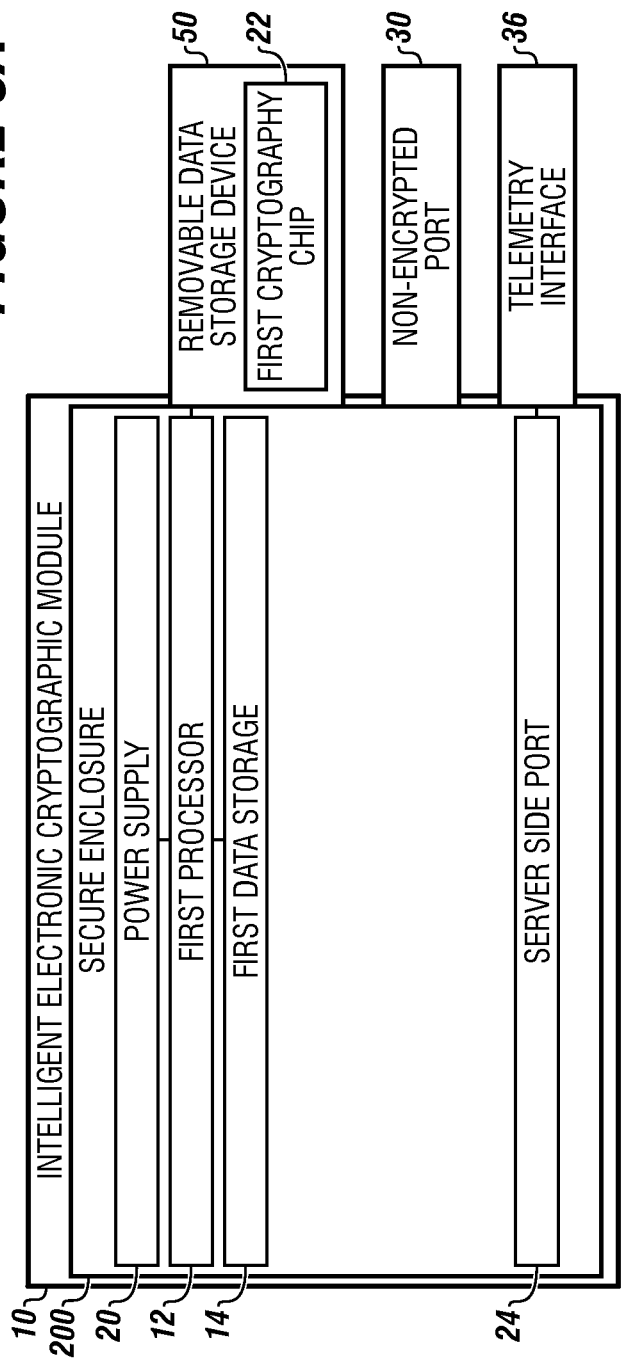

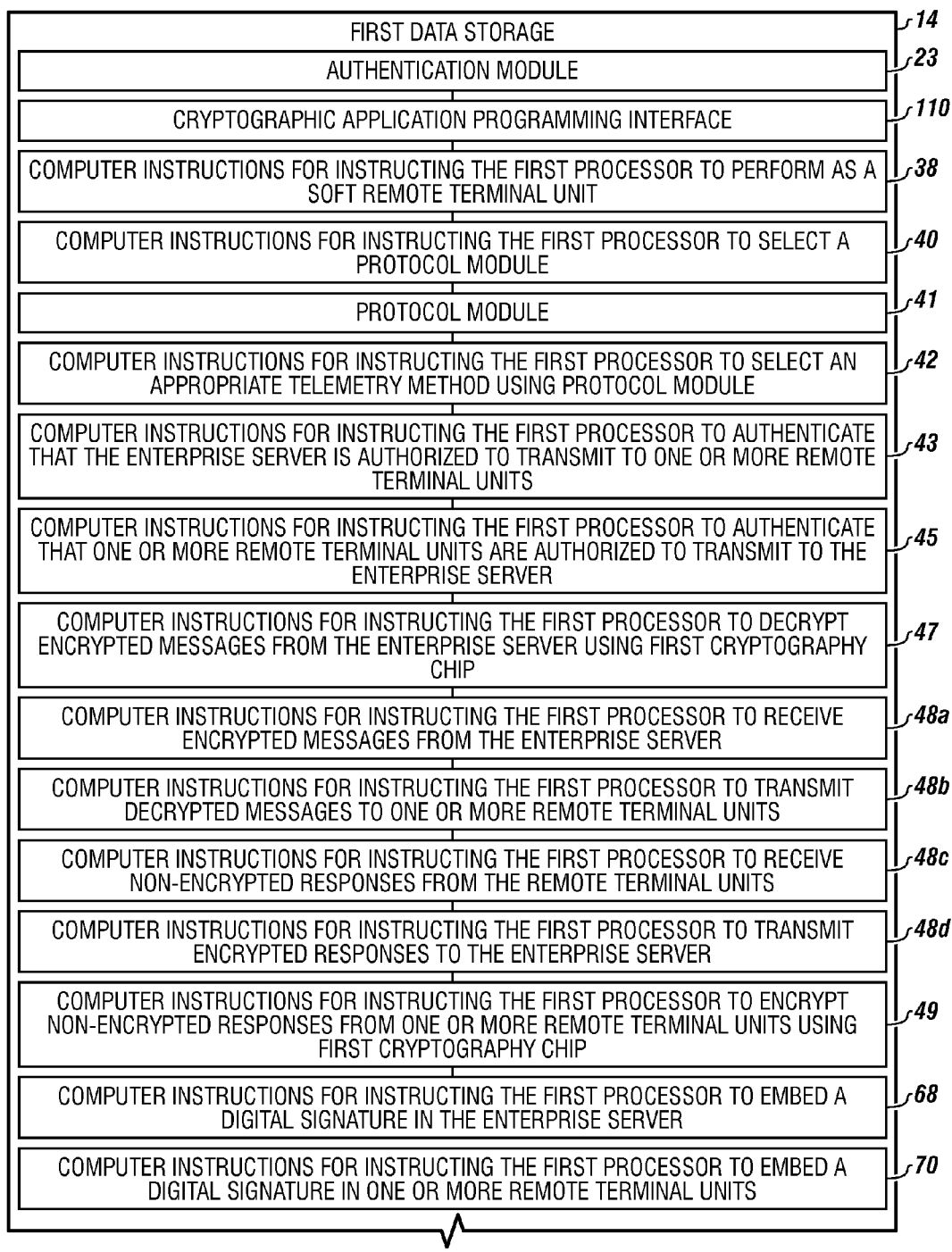

INTELLIGENT ELECTRONIC CRYPTOGRAPHIC CLOUD COMPUTING SYSTEM

FIELD

The present embodiments generally relate to an intelligent electronic cryptographic cloud computing system.

BACKGROUND

A need exists for an intelligent electronic cryptographic cloud computing system able to selectively encrypt, decrypt, and securely transmit messages, commands, data, and responses between an enterprise server and one or more intelligent electronic devices.

A further need exists for an intelligent electronic cryptographic cloud computing system able to perform mixed-mode transmission, selectively encrypting specified messages or messages from a specified source, while omitting encryption of one or more other messages.

A need exists for an intelligent electronic cryptographic cloud computing system that can be configured to perform different mixed-mode transmissions online, without interrupting the normal functions of the intelligent electronic cryptographic module, the enterprise server, or any of the intelligent electronic devices in communication with the intelligent electronic cryptographic module.

A need also exists for an intelligent electronic cryptographic cloud computing system that is able to reconfigure one or more intelligent electronic devices or be reconfigured online, without interrupting the normal functions of the intelligent electronic cryptographic module, the enterprise server, or any of the other intelligent electronic devices in communication with the module.

The present embodiments meet these needs.

BRIEF DESCRIPTION OF THE DRAWINGS

The detailed description will be better understood in conjunction with the accompanying drawings as follows:

FIG. 1 depicts an intelligent electronic cryptographic cloud computing system.

FIG. 2B depicts a detailed view of the enterprise server.

FIG. 3A depicts a diagram of an alternative embodiment of the present intelligent electronic cryptographic module.

FIGS. 3B-3C depict a detailed schematic of the first data storage.

Figure 2A:
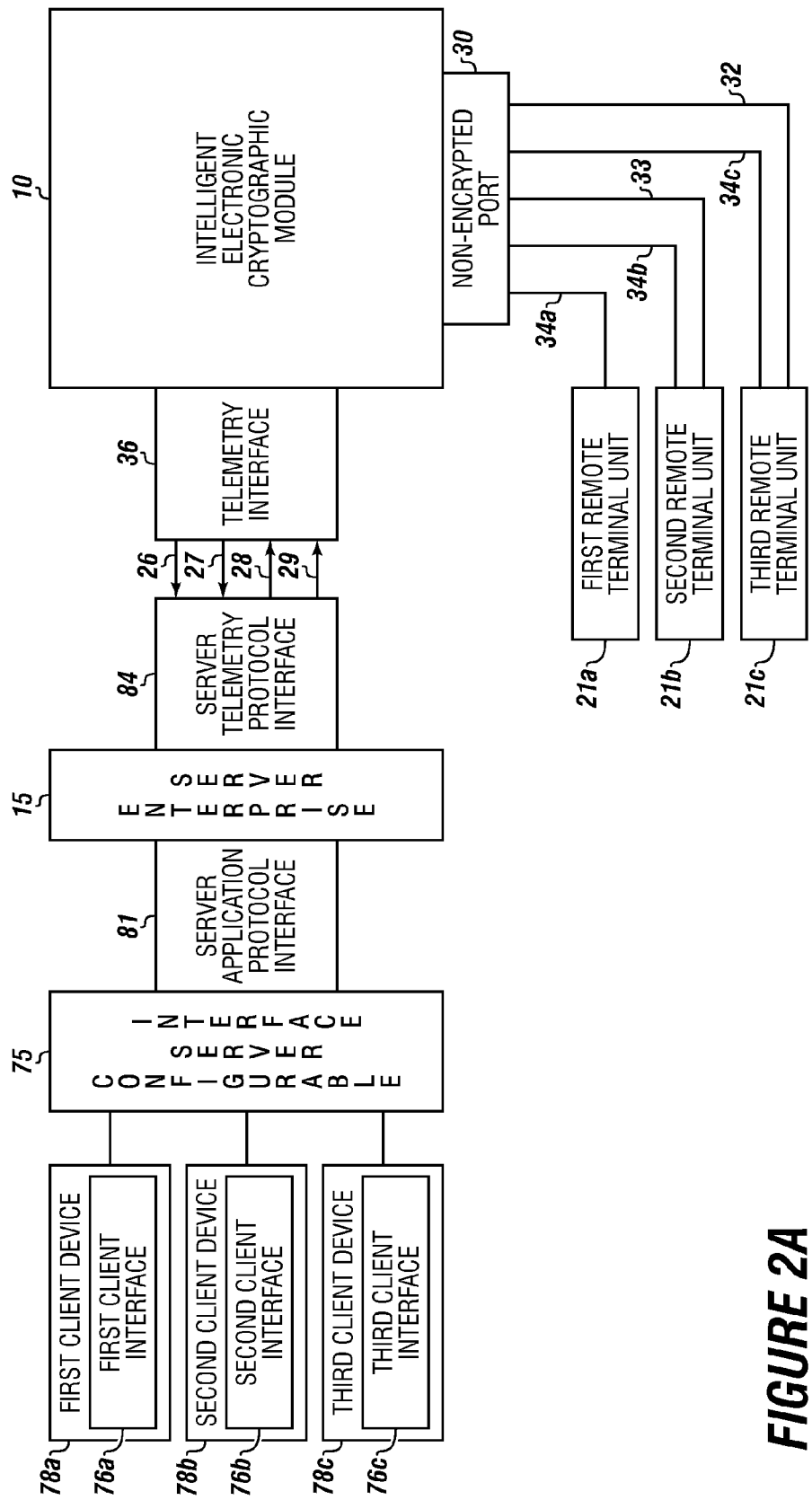
FIG. 2A depicts a diagram depicting a system incorporating the present intelligent electronic cryptographic module.

The present embodiments are detailed below with reference to the listed Figures.

DETAILED DESCRIPTION OF THE EMBODIMENTS

Before explaining the present system in detail, it is to be understood that the system is not limited to the particular embodiments and that they can be practiced or carried out in various ways.

The present embodiments relate to an intelligent electronic cryptographic cloud computing system.

The intelligent electronic cryptographic cloud computing system can include a computing cloud. The computing cloud can include one or more data storage units and one or more processing units, one of which can be an enterprise server. The computing cloud can be configured to provide at least one service with shared hardware and software resources.

The intelligent electronic cryptographic cloud computing system can also include a plurality of intelligent electronic devices in the computing cloud that can communicate with the enterprise server in the computing cloud.

The intelligent electronic cryptographic cloud computing system can include a plurality of intelligent electronic cryptographic modules in the computing cloud.

Each intelligent electronic cryptographic module can include a secure enclosure, at least one power supply and a first processor disposed within a secure enclosure that can communicate with at least one data storage in the computing cloud.

The at least one data storage can include a cryptographic application programming interface. The first processor can be adapted to authenticate between the enterprise server in the computing cloud, the intelligent electronic cryptographic module and at least one intelligent electronic device, provide encrypted and non-encrypted communication with the enterprise server in the computing cloud, and provide non-encrypted communication with the at least one intelligent electronic device.

The intelligent electronic cryptographic module can include a first cryptography chip disposed within the secure enclosure that can decrypt messages from the enterprise server in the computing cloud and encrypt responses from the at least one intelligent electronic device.

The first cryptography chip can be in communication with the first processor.

The intelligent electronic cryptographic module can include at least one server-side port.

The at least one server-side port can receive at least one encrypted message, at least one non-encrypted message, or combinations thereof, from the enterprise server in the computing cloud.

The at least one server-side port can transmit at least one encrypted response, at least one non-encrypted response, or combinations thereof to the enterprise server in the computing cloud.

The at least one server-side port can receive at least one non-encrypted port. The at least one non-encrypted port can be used for transmitting at least one decrypted message, the at least one non-encrypted message or combinations thereof from the intelligent electronic cryptographic module to the at least one intelligent electronic device, and receiving the at least one non-encrypted response from the at least one intelligent electronic device.

The intelligent electronic cryptographic module can include the at least one data storage in the computing cloud.

The at least one data storage in the computing cloud can include computer instructions for instructing the first processor to perform as a soft remote terminal unit, select at least one protocol module for communication with the at least one intelligent electronic device, the enterprise server in the computing cloud, or combinations thereof from at least one protocol module.

The at least one data storage in the computing cloud can include computer instructions for instructing the first processor to select at least one appropriate telemetry method for transmitting and receiving messages using at least one of the selected protocol modules.

The at least one data storage in the computing cloud can include computer instructions for instructing the first processor to at least once authenticate that the enterprise server in the computing cloud is authorized to transmit to the intelligent electronic cryptographic module forming an authenticated enterprise server in the computing cloud.

The at least one data storage in the computing cloud can include computer instructions for instructing the first processor to at least once authenticate that the intelligent electronic cryptographic module is authorized to transmit to the enterprise server in the computing cloud.

The at least one data storage in the computing cloud can include computer instructions for instructing the first processor to receive at least one encrypted message from the authenticated enterprise server in the computing cloud.

The at least one data storage in the computing cloud can include computer instructions for instructing the first processor to decrypt at least one encrypted message transmitted from the authenticated enterprise server in the computing cloud using at least one of the cryptographic modules, forming at least one decrypted message.

The at least one data storage in the computing cloud can include computer instructions for instructing the first processor to transmit at least one decrypted message to the at least one intelligent electronic device.

The at least one data storage in the computing cloud can include computer instructions for instructing the first processor to receive at least one non-encrypted response from the at least one intelligent electronic device.

The at least one data storage in the computing cloud can include computer instructions for instructing the first processor to encrypt at least one non-encrypted response from the at least one intelligent electronic device using the at least one cryptographic modules, forming at least one encrypted response.

The at least one data storage in the computing cloud can include computer instructions for instructing the first processor to transmit at least one encrypted response to the enterprise server in the computing cloud.

The first cryptography chip can be disposed within a first removable data storage device of the intelligent electronic cryptographic module in the cloud computing system.

The enterprise server in the computing cloud can include a server processor, a server telemetry interface, or a server port for receiving a second removable data storage device. The second removable data storage device can include a second cryptography chip. The server processor can also be in communication with a server data storage in the computing cloud. The server data storage in the computing cloud can include a server protocol module and a server connection module.

The at least one encrypted message, the at least one non-encrypted message, or combinations thereof can include at least one reconfiguration command for configuring the at least one intelligent electronic device, the intelligent electronic cryptographic module, the enterprise server in the computing cloud, or combinations thereof.

The intelligent electronic cryptographic cloud computing system can include a telemetry interface in communication with the first processor and the enterprise server in the computing cloud.

The at least one data storage of the intelligent electronic cryptographic module can include removable memory, non-removable memory, flash memory, or combinations thereof.

The at least one power supply of the intelligent electronic cryptographic module can include a direct current source, an alternating current source, at least one rechargeable power source, at least one replaceable power source, at least one renewable power source, or combinations thereof.

The first cryptography chip of the intelligent electronic cryptographic module can include at least one encryption algorithm, at least one decryption algorithm, cryptographic tamper resistant memory, at least one key resident in the cryptographic tamper resistant memory, a random number generator, at least one certificate for digital signatures, an authentication module, or combinations thereof.

The enterprise server in the computing cloud can further include computer instructions that can instruct the server processor in the computing cloud to online configure the at least one intelligent electronic device.

The at least one data storage of the intelligent electronic cryptographic module can include computer instructions for instructing the first processor to embed a first digital signature in the enterprise server in the computing cloud, embed a second digital signature in the intelligent electronic cryptographic module, or transmit and validate the first digital signature, the second digital signature, or combinations thereof, prior to encrypting non-encrypted responses, decrypting encrypted messages, transmitting encrypted responses, or transmitting decrypted messages.

The intelligent electronic cryptographic cloud computing system can include means for wirelessly transmitting messages and responses between the at least one intelligent electronic device and the enterprise server in the computing cloud.

The at least one server-side port, the at least one non-encrypted port, or combinations thereof can be an interface adapted for engaging a serial port, a cellular modem, a standard modem, a wireline modem, a satellite network, a Transfer Connection Protocol/Internet Protocol, an Ethernet, a radio network, a fiber-optic network, or combinations thereof.

The at least one server-side port, the at least one non-encrypted port, or combinations thereof can be adapted to engage at least two industry standard protocols simultaneously.

The at least two industry standard protocols can be a MODBUS, a DNP3.0, a BSAP™, a Megaco/H.248 protocol, a simple message transfer protocol (SMTP), a short message service (SMS) protocol, a multimedia message service (MMS) protocol, an enhanced message service (EMS) protocol, a media gateway control protocol (MGCP), a SIP protocol, a H.323 protocol, an ISDN protocol, a PSTN protocol, and combinations thereof.

The encrypting and decrypting functions of the first cryptography chip can be selectively activated and deactivated.

The intelligent electronic cryptographic module can include computer instructions for instructing the first processor to receive at least one public exchange key from the enterprise server, derive at least one session key, encrypt the at least one session key using the at least one public key, forming at least one encrypted session key, transmit the at least one encrypted session key to the online configurable enterprise server.

The at least one session key can be used to encrypt messages and responses transmitted between the enterprise server in the computing cloud and the intelligent electronic cryptographic module.

The intelligent electronic cryptographic module can include computer instructions for instructing the first processor to derive at least one public exchange key and at least one private exchange key, transmit the at least one public exchange key to the enterprise server in the computing cloud, receive the at least one encrypted session key from the enterprise server in the computing cloud, decrypt the at least one session key using the at least one private key.

The at least one session key can be used to encrypt messages and responses transmitted between the enterprise server in the computing cloud and the intelligent electronic cryptographic module.

Turning now to the Figures, FIG. 1 depicts an intelligent electronic cryptographic cloud computing system.

The computing cloud 1 can include one or more enterprise servers, such as a first enterprise server 15a, a second enterprise server 15b, and a third enterprise server 15c. The enterprise servers 15a-15c can be in communication with one another.

A data storage 3 can also be in the computing cloud 1. The data storage 3 can be in communication with a processor 2. The data storage 3 and the processor 2 can also communicate with the enterprise servers 15a-15c.

A first intelligent electronic cryptographic module 10a and a second intelligent electronic cryptographic module 10b can provide a gateway to the computing cloud 1.

A first remote terminal unit 21a and a second remote terminal unit 21b can speak with one or more components of the computing cloud 1 via the first intelligent electronic cryptographic module 10a, the second intelligent electronic cryptographic module 10b, or both.

A first intelligent electronic device 7a and a second intelligent electronic device 7b can communicate with the computing cloud 1.

Figure 2C:
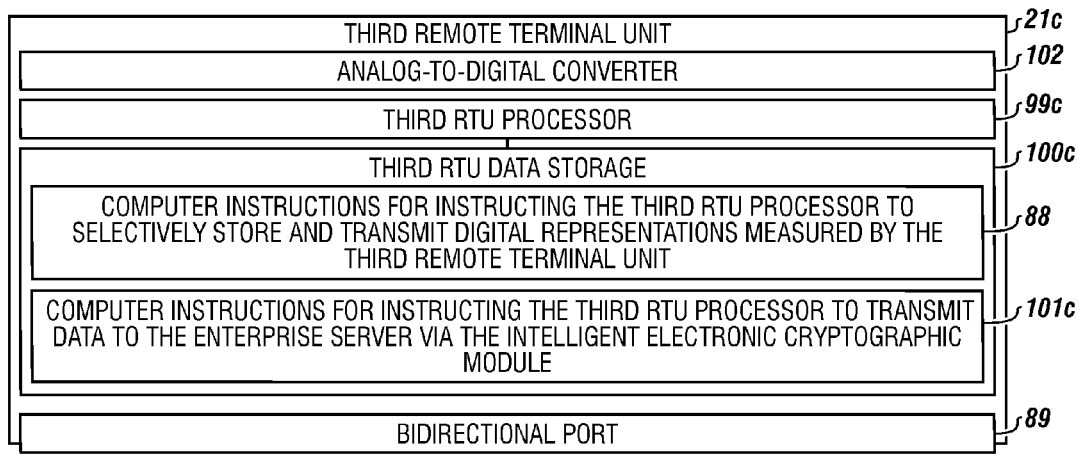
FIG. 2C depicts a detailed view of the third remote terminal unit.

FIG. 2A depicts a diagram of a system incorporating the present intelligent electronic cryptographic module. FIG. 2B depicts a detailed view of the enterprise server. FIG. 2C depicts a detailed view of the third remote terminal unit. FIG. 3A depicts a diagram of an alternative embodiment of the present intelligent electronic cryptographic module.

Referring to FIGS. 2A-2C and FIG. 3A, the intelligent electronic cryptographic module 10 can have a secure enclosure 200, a non-encrypted port 30 for receiving a first non-encrypted response 34a from a first remote terminal unit 21a, a second non-encrypted response 34b from a second remote terminal unit 21b, and a third non-encrypted response 34c from a third remote terminal unit 21c. While the intelligent electronic cryptographic module 10 is depicted in communication with three remote terminal units, the intelligent electronic cryptographic module 10 can be in communication with any type or number of remote terminal units, any type and any number of intelligent electronic devices, or combinations thereof.

The intelligent electronic cryptographic module 10 can include a first processor 12. The first processor 12 can be in communication with a removable data storage device 50, such as a universal serial bus port. The removable data storage device 50 can have a first cryptography chip 22. The first processor 12 can use first cryptography chip 22 to selectively encrypt first non-encrypted response 34a, second non-encrypted response 34b, and third non-encrypted response 34c prior to transmitting each response to a device in communication therewith or the computing cloud. The intelligent electronic cryptographic module 10 is shown having the first processor 12 in communication with the first data storage 14 and a power supply 20. The intelligent electronic cryptographic module 10 is also shown having a server-side port 24, a telemetry interface 36, and the non-encrypted port 30.

The non-encrypted port 30 is also shown transmitting non-encrypted message 33 to the second remote terminal unit 21b and a decrypted message 32 to the third remote terminal unit 21c.

The remote terminal units can be substantially similar to one another. The third remote terminal unit 21c is shown having a third RTU processor 99c and a third RTU data storage 100c. Third RTU data storage has computer instructions for instructing the third RTU processor to transmit data to enterprise server via the intelligent electronic cryptographic module 101c.

The third remote terminal unit 21c is depicted having an analog-to-digital converter 102 and computer instructions in the third RTU data storage 100c for instructing the third RTU processor to selectively store and transmit digital representations measured by the third remote terminal unit 88. Third remote terminal unit 21c also has a bidirectional port 89 for transmitting the digital representations to at least one enterprise server 15 via the intelligent electronic cryptographic module 10 and receiving commands and responses from at least one enterprise server 15.

The enterprise server 15 is shown having a server processor 18 in communication with a server data storage 73. The server data storage 73 is shown having a server authentication module 16, a server protocol module 17, and a server connection module 19. Server data storage 73 also includes computer instructions for reconfiguring the first remote terminal unit, the second remote terminal unit, or the third remote terminal unit 66. Server data storage 73 is further depicted having server configuration database 80, such as an Oracle or Microsoft Access database, for restoring online configurations of the enterprise server when the server is reset. The enterprise server 15 is also shown having a server power supply 83 in communication with the server processor 18.

The enterprise server 15 can also have a server removable data storage device 74 in communication with the server processor 18 via a server port 64, such as a universal serial bus port. The server removable data storage 74 can have a second cryptography chip 25, which can be substantially similar to first cryptography chip 22.

A first client device 78a having first client interface 76a, a second client device 78b having second client interface 76b, and a third client device 78c having third client interface 76c are shown in communication with the enterprise server 15 via a configurable server interface 75, such as OLE for Process Control (OPC), and server application protocol interface 81. First client device 78a, second client device 78b, and third client device 78c can be used to transmit reconfiguration commands to the enterprise server 15 or any of the remote terminal units such as first remote terminal unit 21a, second remote terminal unit 21b, or third remote terminal unit 21c, and to receive data and responses.

The enterprise server 15 can include a server telemetry protocol interface 84. The server telemetry protocol interface 84 can send one or more messages, such as messages 28 and 29, to the intelligent electronic module 10 via the telemetry interface 36. The telemetry interface 36 can send one or more messages, such as messages 26 and 27, to the enterprise server 15 via the server telemetry protocol interface 84.

First client device 78a, second client device 78b, and third client device 78c can be any type of client device, including computers, cellular telephones, personal digital assistants, enterprise data servers, and other similar devices.

Figure 3C:
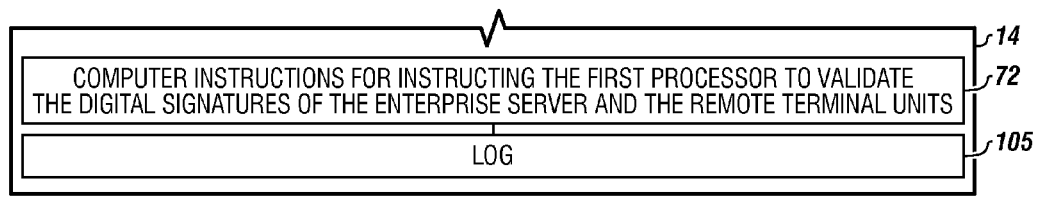

FIGS. 3B-3C depict a detailed schematic of the first data storage.

The first data storage 14 can have an authentication module 23 and a cryptographic application programming interface (CAPI™) 110. The first data storage 14 is also depicted having computer instructions for instructing the first processor to perform as a soft remote terminal unit 38.

The first data storage 14 can have computer instructions for instructing the first processor to select a protocol module 40. A protocol module 41 is depicted within the first data storage 14. While a single protocol module 41 is depicted, any number of selectable protocol modules can be included within the first data storage 14.

The first data storage 14 can include computer instructions for instructing the first processor to select an appropriate telemetry method using the protocol module 42.

The first data storage 14 can also include computer instructions for instructing the first processor to authenticate that the enterprise server is authorized to transmit to one or more remote terminal units 43, and computer instructions for instructing the first processor to authenticate that one or more remote terminal units are authorized to transmit to the enterprise server 45.

The first data storage 14 can have computer instructions for instructing the first processor to decrypt encrypted messages from the enterprise server using the first cryptography chip 47, and computer instructions for instructing the first processor to encrypt non-encrypted responses from one or more remote terminal units using the first cryptography chip 49.

The first data storage 14 can have computer instructions for instructing the first processor to receive encrypted messages from the enterprise server 48*a*, and computer instructions for instructing the first processor to transmit decrypted messages to one or more remote terminal units 48*b*.

The first data storage 14 can have computer instructions for instructing the first processor to receive non-encrypted responses from the remote terminal units 48*c*, and computer instructions for instructing the first processor to transmit encrypted responses to the enterprise server 48*d*.

The first data storage 14 can have computer instructions for instructing the first processor to embed a digital signature in the enterprise server 68.

The first data storage 14 can have computer instructions for instructing the first processor to embed a digital signature in one or more remote terminal units 70.

Additionally, the first data storage 14 can have computer instructions for instructing the first processor to validate the digital signatures of the enterprise server and the remote terminal units 72.

The first data storage 14 can also have a log 105 for storing information from the intelligent electronic cryptographic module, relating to events in the intelligent electronic cryptographic module, such as configuration changes.

Figure 4:
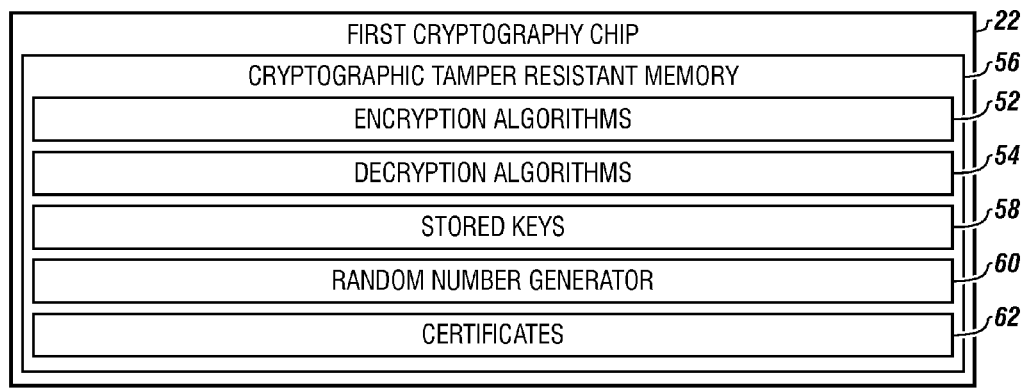
FIG. 4 depicts a diagram of an embodiment of the first cryptography chip within the present intelligent electronic cryptographic module.

FIG. 4 depicts a diagram of an embodiment of the first cryptography chip 22.

The first cryptography chip 22 is shown having cryptographic tamper resistant memory 56. The cryptographic tamper resistant memory 56 can be effective against both electronic and physical attempts to penetrate encryption algorithms.

The cryptographic tamper resistant memory 56 is depicted containing encryption algorithms 52, decryption algorithms 54, stored keys 58, a random number generator 60, and certificates 62 for establishing digital signatures.

The first cryptography chip 22 can include any number of encryption or decryption algorithms, keys, random number generators, or digital signatures, limited only by the capacity of the cryptographic tamper resistant memory 56.

While these embodiments have been described with emphasis on the embodiments, it should be understood that within the scope of the appended claims, the embodiments might be practiced other than as specifically described herein.

What is claimed is:

1. An intelligent electronic cryptographic cloud computing system comprising:
 a. a computing cloud comprising one or more data storages, one or more processors, and an enterprise server with a server processor and a server data storage, wherein the computing cloud is configured to provide at least one service with shared hardware and software resources;
 b. a plurality of intelligent electronic devices in communication with the computing cloud; and
 c. a plurality of intelligent electronic cryptographic modules programmed to selectively receive and encrypt a first non-encrypted response from the enterprise server, receive and transmit a second non-encrypted response from the enterprise server prior to transmitting each non-encrypted response to the least one intelligent electronic device or client devices and programmed to selectively receive and encrypt a first non-encrypted response from the at least one intelligent electronic device, receive and transmit a second non-encrypted response from the at least one intelligent electronic device prior to transmitting each non-encrypted response to the computing cloud, wherein each intelligent electronic cryptographic module comprises:
  i. a secure enclosure;
  ii. at least one power supply;
  iii. a first processor disposed within the secure enclosure, in communication with at least one first data storage in the computing cloud, wherein the at least one first data storage comprises:
   1. a cryptographic application programming interface, programmed to:
    a. authenticate between the enterprise server in the computing cloud and the intelligent electronic cryptographic module providing a secure interface for the at least one intelligent electronic device to the computing cloud;
    b. decrypt encrypted messages from the enterprise server and transmit decrypted messages from the enterprise server to the at least one intelligent electronic device; and
    c. receive non-encrypted communication with the at least one intelligent electronic device, encrypt non-encrypted communications and transmit encrypted responses to the enterprise server;
  iv. a first cryptography chip disposed within the secure enclosure for decrypting messages from the enterprise server in the computing cloud and passing that message to the at least one intelligent electronic device, and encrypting responses from the at least one intelligent electronic device for transmission to the enterprise server in the computing cloud, wherein the first cryptography chip is in communication with the first processor;
  v. at least one server-side port in the intelligent electronic cryptographic module for:
   1. receiving a member of the group consisting of: at least one encrypted message, at least one non-encrypted message, or combinations thereof, from the enterprise server in the computing cloud;
   2. transmitting a member of the group consisting of: at least one encrypted response, at least one non-encrypted response, or combinations thereof to the enterprise server in the computing cloud; and 3. at least one non-encrypted port in the intelligent electronic cryptographic module for:
   a. transmitting at least one decrypted message, the at least one non-encrypted message or combinations thereof from the intelligent electronic cryptographic module to the at least one intelligent electronic device; and
   b. receiving at least one non-encrypted response from the at least one intelligent electronic device; and
   wherein the at least one server-side port, the at least one non-encrypted port, or combinations thereof are adapted to engage at least two industry standard protocols simultaneously; and
vi. wherein the at least one data storage in the computing cloud comprises computer instructions for instructing the processor to:
   1. perform as a soft remote terminal unit;
   2. select at least one protocol module for communication with the at least one intelligent electronic device, the enterprise server in the computing cloud, or combinations thereof;
   3. select at least one appropriate telemetry method for transmitting and receiving messages using at least one selected protocol module;
   4. at least once authenticate that the enterprise server in the computing cloud is authorized to transmit to the intelligent electronic cryptographic module forming an authenticated enterprise server in the computing cloud;
   5. at least once authenticating that the intelligent electronic cryptographic module is authorized to transmit to the enterprise server in the computing cloud;
   6. receive at least one encrypted message from the authenticated enterprise server in the computing cloud;
   7. decrypt at least one encrypted message transmitted from the authenticated enterprise server in the computing cloud using the intelligent electronic cryptographic module, forming at least one decrypted message;
   8. transmit at least one decrypted message to the at least one intelligent electronic device;
   9. receive at least one non-encrypted response from the at least one intelligent electronic device;
   10. encrypt at least one non-encrypted response from the at least one intelligent electronic device using the intelligent electronic cryptographic module, forming at least one encrypted response; or
   11. transmit at least one encrypted response to the enterprise server in the computing cloud.

2. The intelligent electronic cryptographic cloud computing system of claim 1, wherein the first cryptography chip is disposed within a first data storage of the intelligent electronic cryptographic module.

3. The intelligent electronic cryptographic cloud computing system of claim 1, wherein the enterprise server in the computing cloud comprises a server processor, a server telemetry interface, a server port for receiving a second removable data storage device, wherein the second removable data storage device comprises a second cryptography chip, and further wherein the server processor is in communication with a server data storage in the computing cloud and the server data storage in the computing cloud comprises a server protocol module and a server connection module.

4. The intelligent electronic cryptographic cloud computing system of claim 1, wherein the at least one encrypted message, the at least one non-encrypted message, or combinations thereof comprise at least one reconfiguration command for configuring the at least one intelligent electronic device, the intelligent electronic cryptographic module, the enterprise server in the computing cloud, or combinations thereof.

5. The intelligent electronic cryptographic cloud computing system of claim 1, further comprising a telemetry interface in communication with the first processor and the enterprise server in the computing cloud.

6. The intelligent electronic cryptographic cloud computing system of claim 1, wherein the first data storage of the intelligent electronic cryptographic module comprises removable memory, non-removable memory, flash memory, or combinations thereof.

7. The intelligent electronic cryptographic cloud computing system of claim 1, wherein the at least one power supply of the intelligent electronic cryptographic module comprises a direct current source, an alternating current source, at least one rechargeable power source, at least one replaceable power source, at least one renewable power source, or combinations thereof.

8. The intelligent electronic cryptographic cloud computing system of claim 1, wherein the first cryptography chip of the intelligent electronic cryptographic module comprises at least one encryption algorithm, at least one decryption algorithm, cryptographic tamper resistant memory, at least one key resident in the cryptographic tamper resistant memory, a random number generator, at least one certificate for digital signatures, an authentication module, or combinations thereof.

9. The intelligent electronic cryptographic cloud computing system of claim 3, wherein the enterprise server in the computing cloud further comprises computer instructions for instructing the server processor to online configure the at least one intelligent electronic device.

10. The intelligent electronic cryptographic cloud computing system of claim 1, wherein the first data storage of the intelligent electronic cryptographic module further comprises computer instructions for instructing the first processor to embed a first digital signature in the enterprise server in the computing cloud, embed a second digital signature in the intelligent electronic cryptographic module, and transmit and validate the first digital signature, the second digital signature, or combinations thereof, prior to encrypting non-encrypted responses, decrypting encrypted messages, transmitting encrypted responses, or transmitting decrypted messages.

11. The intelligent electronic cryptographic cloud computing system of claim 1, further comprising means for wirelessly transmitting messages and responses between the at least one intelligent electronic device and the enterprise server in the computing cloud.

12. The intelligent electronic cryptographic cloud computing system of claim 1, wherein the at least one server-side port, the at least one non-encrypted port, or combinations thereof is an interface adapted to engage a serial port, a cellular modem, a standard modem, a wire line modem, a satellite network, a Transfer Connection Protocol/Internet Protocol, an Ethernet, a radio network, a fiber-optic network, or combinations thereof.

13. The intelligent electronic cryptographic cloud computing system of claim 1, wherein the at least two industry standard protocols are selected from the group consisting of: a MODBUS, a DNP3.0, a BSAP™, a Megaco/H.248 protocol, simple message transfer protocol (SMTP), a short message service (SMS) protocol, a multimedia message service (MMS) protocol, an enhanced message service (EMS) protocol, a media gateway control protocol (MGCP), a SIP protocol, a H.323 protocol, an ISDN protocol, a PSTN protocol, and combinations thereof.

14. The intelligent electronic cryptographic cloud computing system of claim 1, wherein encrypting and decrypting functions of the first cryptography chip are selectively activated and deactivated.

15. The intelligent electronic cryptographic cloud computing system of claim 1, wherein the intelligent electronic cryptographic module further comprises computer instructions for instructing the first processor to: receive at least one public exchange key from the enterprise server in the computing cloud; derive at least one session key; encrypt the at least one session key using the at least one public exchange key, forming at least one encrypted session key; transmit the at least one encrypted session key to the online configurable enterprise server in the computing cloud; and wherein the at least one encrypted session key is used to encrypt messages and responses transmitted between the enterprise server in the computing cloud and the intelligent electronic cryptographic module.

16. The intelligent electronic cryptographic cloud computing system of claim 1, wherein the intelligent electronic cryptographic module further comprises computer instructions for instructing the first processor to: derive at least one public exchange key and at least one private exchange key; transmit the at least one public exchange key to the enterprise server in the computing cloud; receive at least one encrypted session key from the enterprise server in the computing cloud; decrypt the at least one encrypted session key using the at least one private key; wherein the at least one encrypted session key is used to encrypt messages and responses transmitted between the enterprise server in the computing cloud and the intelligent electronic cryptographic module.

\* \* \* \* \*